(12) United States Patent
Blanc

(10) Patent No.: US 6,430,398 B1
(45) Date of Patent: Aug. 6, 2002

(54) METHOD FOR IMPROVING PERFORMANCE OF A MOBILE RADIOCOMMUNICATION SYSTEM USING POWER CONTROL

(75) Inventor: Patrick Blanc, Issy les Moulineaux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/332,942

(22) Filed: Jun. 15, 1999

(30) Foreign Application Priority Data

May 21, 1999 (EP) .............................. 99401231

(51) Int. Cl.⁷ ................................. H04Q 7/20
(52) U.S. Cl. .................... 455/67.3; 455/69; 455/522
(58) Field of Search ........................ 455/63, 67.1, 69, 455/522, 67.3; 370/332, 333, 335

(56) References Cited

U.S. PATENT DOCUMENTS

| | | | |
|---|---|---|---|
| 5,333,175 A | | 7/1994 | Ariyavisitakul et al. |
| 5,551,057 A | * | 8/1996 | Mitra .......................... 455/522 |
| 5,715,526 A | * | 2/1998 | Weaver Jr. et al. ........... 455/69 |
| 5,774,785 A | | 6/1998 | Karlsson |
| 5,873,028 A | * | 2/1999 | Nakano et al. ................ 455/69 |
| 6,035,210 A | * | 3/2000 | Endo et al. .................. 455/522 |
| 6,118,988 A | * | 9/2000 | Choi ........................... 455/522 |

FOREIGN PATENT DOCUMENTS

| | | |
|---|---|---|
| EP | 0 709 973 A1 | 5/1996 |
| EP | 0 856 955 A2 | 8/1998 |

OTHER PUBLICATIONS

Yates R D et al: "Soft Dropping Power Control" IEEE Vehicular Technology Conference, US, New York, IEEE, vol. Conf. 47, pp. 1694–1698 XP000738652 ISBN: 0–7803–3660–7.

* cited by examiner

Primary Examiner—Nay Maung
(74) Attorney, Agent, or Firm—Sughrue Mion, PLLC

(57) ABSTRACT

A method for improving performances of a mobile radiocommunication system using a power control loop which controls power according to a transmission quality target value, and an adjustment process for adjusting said transmission quality target value, a method wherein said adjustment process is controlled based on an assessment of the convergence of said power control loop around said transmission quality target value.

27 Claims, 3 Drawing Sheets

METHOD FOR IMPROVING PERFORMANCE OF A MOBILE RADIOCOMMUNICATION SYSTEM USING POWER CONTROL

BACKGROUND OF THE INVENTION

The present invention is generally concerned with mobile radiocommunication systems.

The present invention is more particularly concerned with power control used in such systems to improve performances (in terms of quality of service, of capacity, . . . etc.).

The present invention is in particular applicable to mobile radiocommunication systems of CDMA ("Code Division Multiple Access") type. In particular, the present invention is applicable to UMTS ("Universal Mobile Telecommunication System").

One type of power control which is used in CDMA systems is the so-called closed-loop power control.

The closed loop generally runs on a fast basis in order to adjust the transmission quality (generally represented by the SIR, or "Signal-to-lnterference Ratio") around a transmission quality target value (generally a $SIR_{target}$ value), by sending appropriate power control commands back to the transmitter. The closed loop thus sends an "up" power control command back to the transmitter when the estimated SIR is below the $SIR_{target}$ value, or a "down" power control command otherwise.

The $SIR_{target}$ value is generally adjusted by a so-called outer loop. The outer loop generally runs on a slower basis in order to adjust the quality of service (generally represented by the BER, or "Bit Error Rate", or the FER, or "Frame Error Rate") around a quality of service target value (generally a BER or FER target value). The outer loop thus increases the $SIR_{target}$ value when an estimated BER or FER is above a BER or FER target value, or reduces it otherwise.

Such an implementation may lead to such situations where the $SIR_{target}$ value is needlessly increased, therefore needlessly increasing the interference level in the system.

This may in particular be the case under such conditions as when the transmitter has already reached its maximum transmit power, or when the system has become overloaded. In such a case the $SIR_{target}$ value is uselessly increased, while this cannot result in any quality improvement. This may not be considered as a drawback in itself, as long as such conditions apply, but the $SIR_{target}$ value may therefore reach a too high value, and, when such conditions no longer apply, this will result in setting the transmit power at a level higher than necessary, therefore needlessly increasing the interference level in the system, until the algorithm reaches a correct value again.

The outer loop is usually implemented at the receiver side, in order to reduce adaptation delays between quality measurements and $SIR_{target}$ setting However, the receiver may not have means to know why the quality of service cannot be maintained with the current $SIR_{target}$ value, and, as indicated above, may try to increase it, even though the current $SIR_{target}$ value cannot be reached due to network overload for instance.

Therefore there is a need to provide a power control method avoiding such drawbacks.

SUMMARY OF THE INVENTION

An object of the present invention is therefore a method for improving performances of a mobile radiocommunication system using a power control loop which controls power according to a transmission quality target value, and an adjustment process for adjusting said transmission quality target value, a method wherein said adjustment process is controlled based on an assessment of the convergence of said power control loop around said transmission quality target value.

According to another object of this invention, said control of said adjustment process includes not performing any adjustment, if said power control loop has not converged around said transmission quality target value.

According to another object of this invention, convergence of said power control loop is assessed by determining if a difference between an estimated average transmission quality and said transmission quality target value is within given margins.

According to another object of this invention, said margins are determined so as to take into account power control errors.

According to another object of this invention, said margins are optimised according to radio conditions.

According to another object of this invention, said margins are different depending on whether said adjustment requires increasing or reducing said transmission quality target value.

According to another object of this invention, said estimated average transmission transmission quality is estimated on an averaging period which is long enough to enable said power control loop to converge, but not too long to take into account fast changes in power control requirements.

According to another object of this invention, said averaging period is optimised according to radio conditions.

According to another object of this invention, convergence of said loop is assessed by determining if, among successive values representative of an estimated average transmission quality, at least one of these values is above said transmission quality target value and at least one of these values is below said transmission quality target value.

According to another object of this invention, said transmission quality is represented by a Signal-to-Interference Ratio (SIR).

According to another object of this invention, said adjustment process is an outer loop which adjusts a quality of service around a quality of service target value.

According to another object of the invention, said mobile radiocommunication system is of CDMA type.

According to another object of the invention, said power control is performed in on uplink transmission direction of said mobile radiocommunication system, using an uplink power control loop and an uplink adjustment process, and said uplink adjustment process is controlled, based on an assessement of the convergence of said uplink power control loop.

According to another object of the invention, said power control is performed in a downlink transmission direction of said mobile radiocommunication system, using a downlink power control loop and a downlink adjustment process, and said downlink adjustment process is controlled, based on an assessment of the convergence of said downlink power control loop.

The present invention also has for its object a mobile radiocommunication network for performing such a method, said mobile radiocommunication network comprising means for performing said uplink power control loop, means for performing said uplink adjustment process, and means for controlling said uplink adjustment process, based on an assessment of the convergence of said uplink power control loop.

According to another object of this invention, said mobile radiocommunication network is of the type comprising at least one base station, comprising means for performing said uplink power control loop, and at least one base station controller, comprising means for performing said uplink adjustment process.

According to another object of this invention, a base station of such a network comprises;
  means for performing measurements necessary for the assessment of the convergence of said uplink power control loop,
  means for sending such measurements to a base station controller.

According to another object of this invention, a base station controller of such a network comprises:
  means for receiving such measurements from a base station,
  means for assessing the convergence of said uplink power control loop, based on such measurements, and for controlling said uplink adjustment process, based on this assessment.

The present invention also has for its object a mobile station for performing such a method, said mobile station comprising means for performing said downlink power control loop, means for performing said downlink adjustment process, and means for controlling said downlink adjustment process, based on an assessment of the convergence of said downlink power control loop.

According to another object of this invention, such a mobile station comprises:
  means for performing measurements necessary for the assessment of the convergence of said downlink power control loop,
  means for assessing the convergence of said downlink power control loop, based on such measurements, and for controlling said downlink adjustment process, based on this assessment.

According to another object of this invention, such a mobile station further comprises means for receiving parameters required for said assessment of convergence of said downlink power control loop, from a mobile radiocommunication network.

BRIEF DESCRIPTION OF THE DRAWINGS

These and other objects of the present invention will become more apparent from the following description taken in conjunction with the accompanying drawings.

DETAILED DESCRIPTION OF THE INVENTION

The present invention thus has for its object a method for improving performances of a mobile radiocommunication system using a power control loop which controls power according to a transmission quality target value, and an adjustment process for adjusting said transmission quality target value, a method wherein said adjustment process is controlled, based on an assessment of the convergence of said power control loop around said transmission quality target value.

Figure 1:
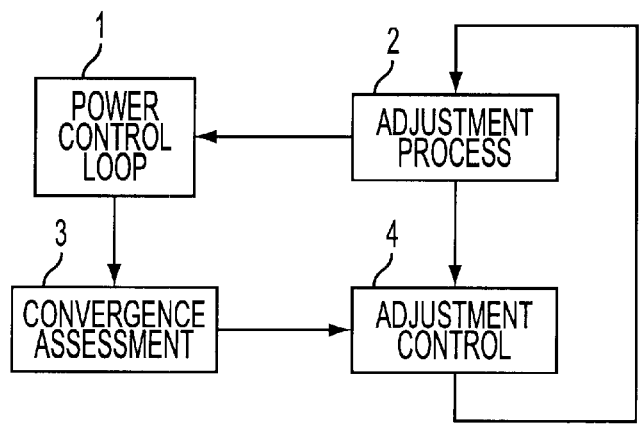
FIG. 1 is a diagram intended to illustrate a method according to the invention.

Such a method may be illustrated by the diagram of FIG. 1, where:
  1 refers to a power control loop,
  2 refers to said adjustment process
  3 refers to an assessment of the convergence of said power control loop,
  4 refers to a control of said adjustment process, based on said assessment.

Generally, such a method enables to optimise performances, by optimising the adjustment process.

In particular, by providing that no adjustment of the transmission quality target value is performed if said power control loop has not yet converged around this target value, this enables to avoid the above mentioned drawbacks.

Still in particular, by considering the current case where the adjustment process is the outer loop algorithm as mentioned above, and the power control loop is the closed loop as mentioned above, this may be expressed by the following algorithm:
  If outer loop algorithm requests a change of $SIR_{target}$, If closed loop power control has converged, the request is accepted Else the request is rejected.

An example of implementation of such an algorithm may be expressed as follows:
  If ($Avgd\_FER < FER_{target}$) and ($|SIR_{av} - SIR_{target}| < \eta$), $SIR_{target} = SIR_{target} - SIR_{dec-step}$
  if ($Avgd\_FER > FER_{target}$) and ($|SIR_{av} - SIR_{target}| < \epsilon$), $SIR_{target} = SIR_{target} - SIR_{inc-step}$ In this example $SIR_{inc-step}$ and $SIR_{dec-step}$ are the specified steps for updating (increasing, respectively decreasing) $SIR_{target}$ values.

In this example ($Avgd\_FER < FER_{target}$) or ($Avgd\_FER > FER_{target}$) are the conditions in which the outer loop requests updating $SIR_{target}$ where:
  Avgd_FER is a measured FER averaged over a given period. Other quality parameters could be used such as Block Error Rate, number of retransmissions of PDU in RLC for packet services, etc.
  $FER_{target}$ is the FER target value specified for the bearer service (given at call or session set up).

In this example, convergence of the power control closed loop is assessed by determining if the difference between an estimated average transmission quality and said transmission quality target value is within given margins, i.e. if $$(|SIR_{av} - SIR_{target}| < \eta) \text{ or } (|SIR_{av} - SIR_{target}| < \epsilon)$$

where:
  $SIR_{target}$ is the SIR target value set by the outer loop algorithm and used by the closed loop power control
  $SIR_{av}$ is the SIR measured and averaged over a given averaging period. This averaging period is a parameter of the system that may be optimised according to radio conditions. It should start of least after the lost change in $SIR_{target}$ value, should be long enough to allow the closed loop to reach the new value, but should not be too long to identify fast changes in case of overload situations for instance $\epsilon, \eta$ are margins related to the difference between $SIR_{av}$ measurements and SIR target values (for the case where $SIR_{target}$ needs to be increased, respectively decreased), taking into account power control errors These parameters may also be optimised according to radio conditions.

Other examples may be envisaged to assess the convergence of the closed loop power control. For instance, it may be considered that the closed loop has converged, when among successive values of $SIR_{av}$ at least one of these values is below $SIR_{target}$ and at least one of these values is above $SIR_{target}$.

Besides, it should be noted that parameters other than SIR might be used to assess the convergence of the closed loop power control, to take into account non precise measurements in case of bad SIR estimation (for low SIR values in particular).

The present invention may be applied to uplink power control, downlink power control, or both uplink and downlink power control As compared to known methods, the method according to the invention may require additional measurements as well as additional signalling to be performed.

As an example, an application of the present invention to the UTRAN architecture of UMTS will be disclosed in the following.

Figure 2:
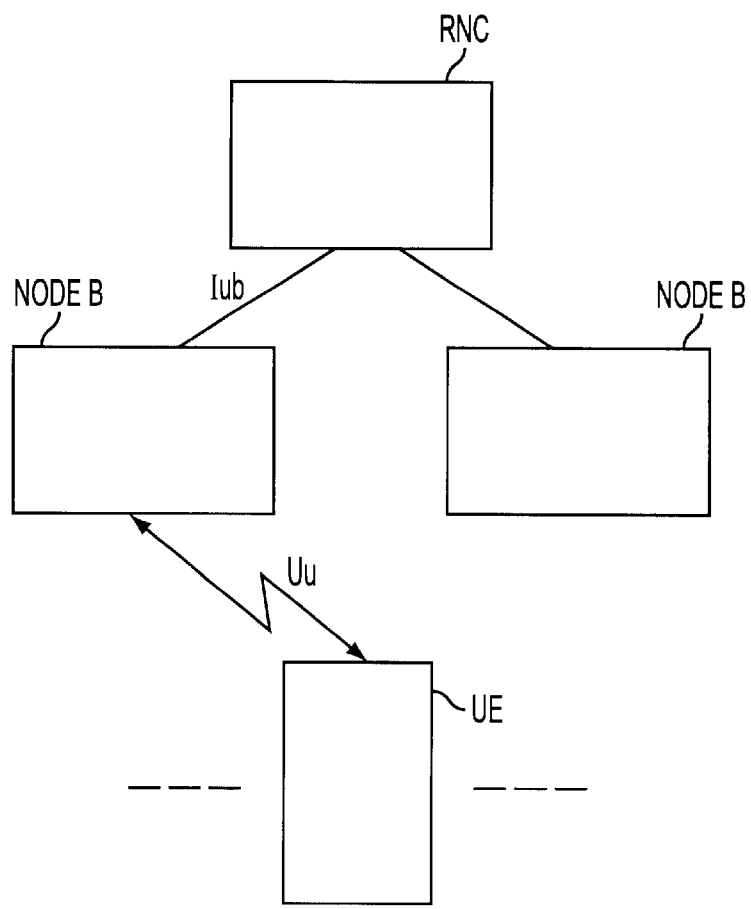
FIG. 2 is a diagram intended to illustrate the general architecture of the radio access network, or "UTRAN" ("UMTS Terrestrial Radio Access Network"), of UMTS system.

As recalled in FIG. 2, the current UTRAN architecture comprises:

base stations, called "Node B", which communicate with mobile stations or "User Equipments" (UE) via a radio interface called "Uu", base station controllers, called "Radio Network Controllers" or RNC, which communicate with Nodes B via an interface called "Iub" (each RNC controlling a plurality of Nodes B).

Within this architecture, for uplink power control the closed loop is currently implemented in Node B. while the outer loop is currently implemented in RNC; for downlink power control both loops are currently implemented in UE.

A method according to the invention may then require additional measurements to be performed, in Node B for uplink power control and in UE for downlink power control, as well as additional signalling to be performed between Node B and RNC at the interface Iub, for uplink power control.

Figure 3:
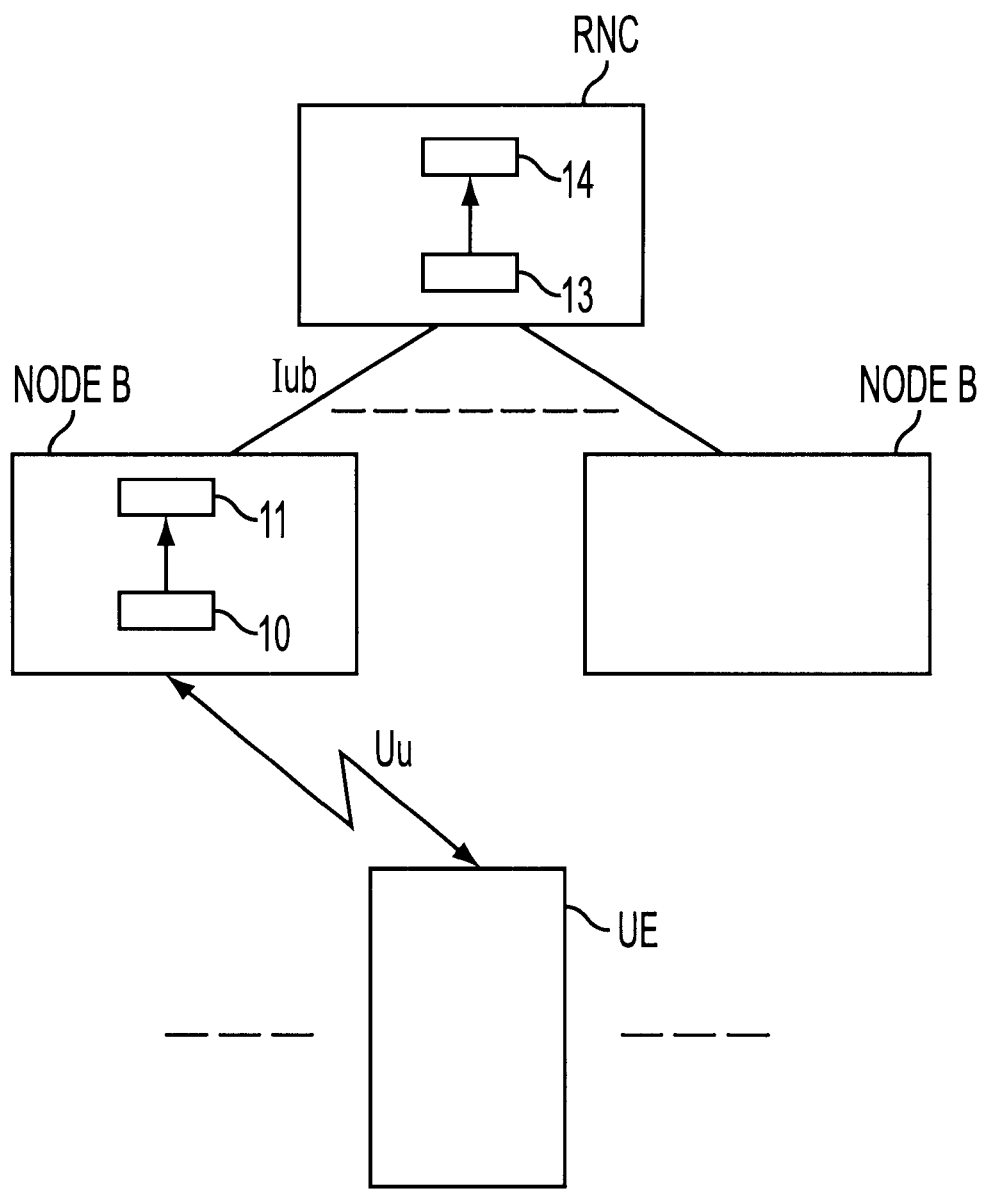
FIG. 3 is a diagram intended to illustrate an example of means which may be used in an entity like a base station or Node B of UTRAN, and in an entity like a base station controller or SRNC of UTRAN, to perform a method according to the present invention, for uplink power control.

As illustrated at FIG. 3, a Node B may therefore comprise, besides other means which may be classical and which are not mentioned here:

means 10 for performing measurements required for the assessment of convergence of the uplink power control loop, means 11 for sending such measurements to RNC.

As illustrated at FIG. 3, a RNC may therefore comprise, besides other means which may be classical and which are not mentioned here:

means 13 for receiving such measurements from Node B, means 14 for assessing the convergence of said uplink power control loop, based on such measurements, and for controlling the uplink adjustment process, or uplink outer loop, based on this assessment.

Means like 10, 11, 13, 14 work together so as to perform the above disclosed method, for uplink power control. Such means do not need to be more fully disclosed than by their above disclosed function, for a person skilled in the art. Besides, the required signalling may be performed according to known types of signalling procedures in such types of systems, and therefore does not either require to be more fully disclosed, for a person skilled in the art.

For example, the measurements required for the assessment of convergence, and sent by Node B to RNC across the Iub interface, may be sent in bond with data PDU ("Packet Data Unit") or out of band.

For example, such measurements as $SIR_{av}$ (such as SIR averaged over the transmission time period of a data frame) may be sent in bond for each uplink data frame.

Figure 4:
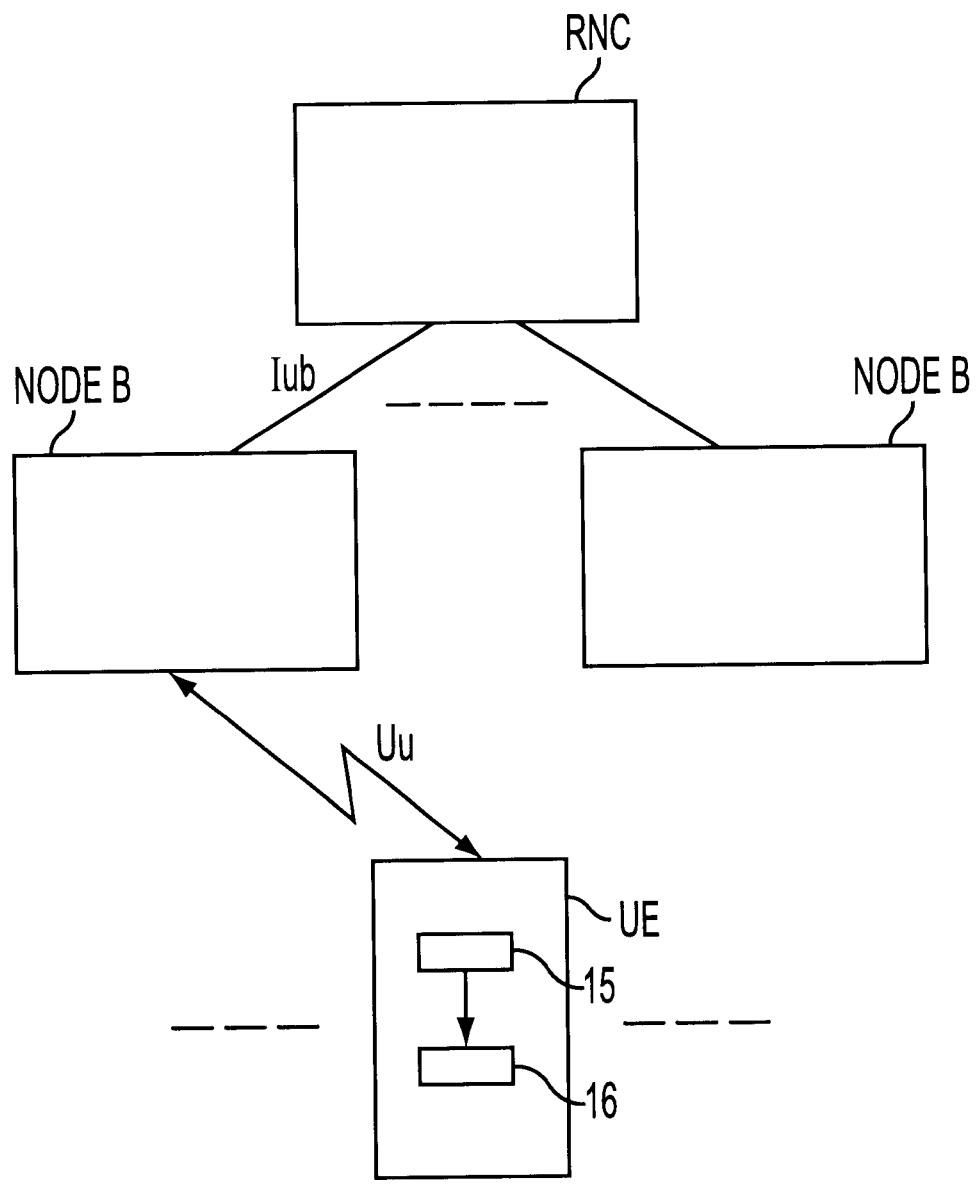
FIG. 4 is a diagram intended to illustrate an example of means which may be used in a mobile station, or user equipment (UE) to perform a method according to the present invention, for downlink power control.

As illustrated at FIG. 4, a User Equipment UE may comprise, besides other means which may be classical and which are not mentioned here:

means 15 for performing measurements required for the assessment of convergence of the downlink power control closed loop, means 16 for assessing said convergence, based on such measurements, and for controlling the downlink adjustment process, or downlink outer loop, based on this assessment.

No additionnal signalling is therefore required for downlink power control.

However, parameters necessary for the assessment of convergence, such as for instance parameter e referred to in the above disclosed example may need to be signalled to each UE, in case network control on said downlink adjustment control would be needed. Alternatively, parameter $\epsilon$ for instance may be evaluated by the UE from past measurements.

Means like 15, 16 work together so as to perform the above disclosed method, for downlink power control. Such means do not either require to be more fully disclosed than by their above disclosed function, for a person skilled in the art.

What is claimed is:

1. A method for improving performances of a mobile radiocommunication system using a power control loop which controls power according to a transmission quality target value, and an adjustment process for adjusting said transmission quality target value, a method wherein said adjustment process is controlled based on an assessment of the convergence of said power control loop around said transmission quality target value.

2. A method according to claim 1, wherein said control of said adjustment process includes not performing any adjustment, if said power control loop has not converged around said transmission quality target value.

3. A method according to claim 1, wherein said transmission quality is represented by a Signal-to-Interference Ratio 4. A method according to claim 1, wherein said adjustment process is an outer loop which adjusts a quality of service around a quality of service target value.

5. A method according to claim 1, wherein said mobile radiocommunication system is of CDMA type.

6. A method according to claim 1, wherein said power control is performed in an uplink transmission direction of said mobile radiocommunication system, using an uplink power control loop and an uplink adjustment process, and wherein said uplink adjustment process is controlled, based on an assessement of the convergence of said uplink power control loop.

7. A mobile radiocommunication network for performing a method according to claim 6, said mobile radiocommunication network comprising means for performing said uplink power control loop, means for performing said uplink adjustment process, and means for controlling said uplink adjustment process based on an assessment of the convergence of said uplink power control loop.

8. A mobile radiocommunication network according to claims 7, said mobile radiocommunication network being of the type comprising at least one base station, comprising means for performing said uplink power control loop, and at least one base station controller, comprising means for performing said uplink adjustment process.

9. A base station of a mobile radiocommunication network according to claim 8, comprising:
means for performing measurements necessary for the assessment of the convergence of said uplink power control loop,
means for sending such measurements to a base station controller.

10. A base station controller of a mobile radiocommunication network according to claim 8, comprising:
means for receiving measurements necessary for the assessment of the convergence of said uplink power control loop, from a base station,
means for assessing the convergence of said uplink power control loop, based on such measurements, and for controlling said uplink adjustment process, based on this assessment.

11. A method according to claim 1, wherein said power control is performed in a downlink transmission direction of said mobile radiocommunication system, using a downlink power control loop and a downlink adjustment process, and wherein said downlink adjustment process is controlled, based on an assessement of the convergence of said downlink power control loop.

12. A mobile station for performing a method according to claim 11, said mobile station comprising means for performing said downlink power control loop, means for performing said downlink adjustment process, and means for controlling said downlink adjustment process based on an assessment of the convergence of said downlink power control loop.

13. A mobile station according to claim 12, comprising:
means for performing measurements necessary for the assessment of the convergence of said downlink power control loop,
means for assessing the convergence of said downlink power control loop, based on such measurements, and for controlling said downlink adjustment process, based on this assessment.

14. A mobile station according to claim 13, further comprising means for receiving parameters required for said assessment of convergence of said downlink power control loop, from a mobile radiocommunication network.

15. A mobile radiocommunication system including at least one mobile station according to claim 12.

16. A method for improving performances of a mobile radiocommunication system using a power control loop which controls power according to a transmission quality target value, and an adjustment process for adjusting said transmission quality target value, a method wherein said adjustment process is controlled based on an assessment of the convergence of said power control loop around said transmission quality target value, wherein convergence of said power control loop is assessed by determining if the difference between an estimated average transmission quality and said transmission quality target value is within given margins.

17. A method according to claim 16, wherein said margins are determined so as to take into account power control errors.

18. A method according to claim 16, wherein said margins are optimised according to radio conditions.

19. A method according to claim 16, wherein said margins are different depending on whether said adjustment requires increasing or reducing said transmission quality target value.

20. A method according to claim 16, wherein said estimated average transmission transmission quality is estimated on an averaging period which is long enough to enable said power control loop to converge, but not too long to take into account fast changes in power control requirements.

21. A method according to claim 16, wherein said averaging period is optimised according to radio conditions.

22. A method for improving performances of a mobile radiocommunication system using a power control loop which controls power according to a transmission quality target value, and an adjustment process for adjusting said transmission quality target value, a method wherein said adjustment process is controlled based on an assessment of the convergence of said power control loop around said transmission quality target value, wherein convergence of said power control loop is assessed by determining if, among successive values representative of an estimated average transmission quality, at least one of these values is above said transmission quality target value and at least one of these values is below said transmission quality target value.

23. A method for improving the performance of a mobile radio communication system using a downlink power control loop for controlling power according to a SIR target value, and a using a downlink adjustment process for adjusting said SIR target value, a method comprising:
making a convergence assessment as to whether said downlink power control loop is
converging around said SIR target value; and
controlling said downlink adjustment process based on said convergence assessment;
wherein said SIR target value is not increased by said downlink adjustment process when said
convergence assessment indicates that said downlink power control loop is not converging
around said SIR target value.

24. The method as set forth in claim 23, wherein said convergence assessment is made by comparing an averaged, measured SIR to said SIR target value.

25. A mobile station, comprising:
means for performing a downlink power control loop for controlling power according to a SIR
target value;
means for performing a downlink adjustment process for adjusting said SIR target value; and
means for preventing, when said downlink power control loop is not converging around said
SIR target value, said downlink adjustment process from increasing said SIR target value.

26. The mobile station as set forth in claim 25, further comprising means for assessing whether said downlink power control loop is or is not converging around said SIR target value of said power control loop by comparing an averaged, measured SIR to said SIR target value.

27. A mobile radiocommunication system including at least one mobile station according to claim 25.

* * * * *